US010878067B2

(12) United States Patent
Lev et al.

(10) Patent No.: US 10,878,067 B2
(45) Date of Patent: Dec. 29, 2020

(54) PHYSICAL ACTIVITY AND IT ALERT CORRELATION

(71) Applicant: NEC Corporation Of America, Herzlia (IL)

(72) Inventors: Tsvi Lev, Tel-Aviv (IL); Doron Gonen, Modiln (IL); Moshe Karako, Kiryat-Ono (IL); Yaacov Hoch, Ramat-Gan (IL)

(73) Assignee: NEC Corporation Of America, Herzlia (IL)

(*) Notice: Subject to any disclaimer, the term of this patent is extended or adjusted under 35 U.S.C. 154(b) by 259 days.

(21) Appl. No.: 16/034,391

(22) Filed: Jul. 13, 2018

(65) Prior Publication Data

US 2019/0018939 A1    Jan. 17, 2019

Related U.S. Application Data

(60) Provisional application No. 62/531,986, filed on Jul. 13, 2017.

(51) Int. Cl.
| | |
|---|---|
| *G06F 21/31* | (2013.01) |
| *H04W 4/38* | (2018.01) |
| *G06K 9/62* | (2006.01) |
| *G06K 9/00* | (2006.01) |
| *H04L 29/08* | (2006.01) |

(Continued)

(52) U.S. Cl.
CPC ....... *G06F 21/316* (2013.01); *G06K 9/00362* (2013.01); *G06K 9/00771* (2013.01); *G06K 9/6288* (2013.01); *H04L 63/102* (2013.01); *H04L 63/1425* (2013.01);

(Continued)

(58) Field of Classification Search
CPC ... G06F 21/316; H04W 4/38; G06K 9/00362; G06K 9/00771
See application file for complete search history.

(56) References Cited

U.S. PATENT DOCUMENTS

| | | | |
|---|---|---|---|
| 8,832,790 B1* | 9/2014 | Villa | H04L 63/123 726/2 |
| 9,037,125 B1* | 5/2015 | Kadous | H04M 1/72577 455/418 |

(Continued)

OTHER PUBLICATIONS

NPL Search (Google Scholar) (Year: 2020).*

*Primary Examiner* — Mahfuzur Rahman
*Assistant Examiner* — Richard W Cruz-Franqui

(57) ABSTRACT

A computer implemented method of correlating between detected access events to access client terminals in a monitored location and physical activity of people in the monitored location, comprising detecting one or more access events to access one or more of a plurality of client terminals located in a monitored location and operatively connected to a first network, obtaining sensory activity data from one or more activity detectors deployed in the monitored location to capture physical activity of people in the monitored location wherein the activity detector(s) are operatively connected to a second interconnection isolated from the first network, analyzing the sensory activity data to identify a spatiotemporal activity pattern of one or more persons in the monitored location, correlating between the access event(s) and the spatiotemporal activity pattern(s) to validate the access event(s) and initiating one or more actions according to the validation.

23 Claims, 3 Drawing Sheets

(51) Int. Cl.
*H04L 29/06* (2006.01)
*G06N 20/00* (2019.01)

(52) U.S. Cl.
CPC ............ *H04L 67/22* (2013.01); *H04L 67/306* (2013.01); *H04W 4/38* (2018.02); *G06N 20/00* (2019.01)

(56) References Cited

U.S. PATENT DOCUMENTS

| | | | | |
|---|---|---|---|---|
| 9,398,007 | B1* | 7/2016 | Wegener | H04W 12/0602 |
| 9,813,285 | B1* | 11/2017 | McGovern | G06F 21/316 |
| 10,229,255 | B2* | 3/2019 | Rome | G06F 3/0233 |
| 10,298,622 | B2* | 5/2019 | Kaushansky | H04L 63/308 |
| 2004/0190718 | A1* | 9/2004 | Dacosta | H04L 63/0492 380/247 |
| 2007/0220595 | A1* | 9/2007 | M'raihi | H04L 63/1416 726/5 |
| 2008/0086775 | A1* | 4/2008 | Repasi | G06F 21/55 726/24 |
| 2009/0254975 | A1* | 10/2009 | Turnbull | H04L 63/0492 726/3 |
| 2009/0265775 | A1* | 10/2009 | Wisely | H04W 12/06 726/9 |
| 2010/0097494 | A1* | 4/2010 | Gum | G01S 19/14 348/231.5 |
| 2012/0167162 | A1* | 6/2012 | Raleigh | H04L 63/10 726/1 |
| 2014/0099028 | A1* | 4/2014 | Shirron | G06F 40/174 382/181 |
| 2014/0181971 | A1* | 6/2014 | Tatarinov | G06F 21/316 726/23 |
| 2014/0341441 | A1* | 11/2014 | Slaby | G06F 21/32 382/117 |
| 2014/0366111 | A1* | 12/2014 | Sheller | G06F 21/31 726/7 |
| 2015/0205962 | A1* | 7/2015 | Swidowski | G06F 21/554 726/23 |
| 2016/0006576 | A1* | 1/2016 | Matsuzaki | H04Q 9/00 709/224 |
| 2016/0110537 | A1* | 4/2016 | Harrison | G06F 21/33 705/14.66 |
| 2016/0119017 | A1* | 4/2016 | Xu | H04B 1/48 455/79 |
| 2016/0180820 | A1* | 6/2016 | Pascucci | G09G 5/34 345/684 |
| 2016/0202947 | A1* | 7/2016 | Ramalingam | G09G 3/001 345/156 |
| 2016/0204839 | A1* | 7/2016 | Liu | G02C 11/10 345/8 |
| 2016/0226872 | A1* | 8/2016 | Oberheide | H04L 63/0876 |
| 2016/0380993 | A1* | 12/2016 | Shiraishi | H04L 63/0492 726/7 |
| 2017/0026797 | A1* | 1/2017 | Venkataraman | G01S 19/48 |
| 2017/0032114 | A1* | 2/2017 | Turgeman | H04W 12/06 |
| 2017/0048706 | A1* | 2/2017 | Kang | H04W 12/0605 |
| 2017/0161478 | A1* | 6/2017 | Stavrou | G06F 21/316 |
| 2017/0244689 | A1* | 8/2017 | Cetlur | G06F 21/552 |
| 2017/0289168 | A1* | 10/2017 | Bar | H04L 63/102 |
| 2018/0157825 | A1* | 6/2018 | Eksten | H04L 9/3239 |
| 2018/0219878 | A1* | 8/2018 | Hirshberg | G06F 21/85 |
| 2018/0248895 | A1* | 8/2018 | Watson | G06N 3/08 |
| 2018/0262498 | A1* | 9/2018 | Be'ery | H04L 63/1416 |
| 2018/0316704 | A1* | 11/2018 | Joseph | H04L 63/1425 |
| 2019/0007523 | A1* | 1/2019 | Walker | H04L 67/28 |
| 2019/0018939 | A1* | 1/2019 | Lev | H04L 67/306 |
| 2019/0205511 | A1* | 7/2019 | Zhan | G06F 21/45 |
| 2019/0361694 | A1* | 11/2019 | Gordon | G06F 1/1643 |

* cited by examiner

US 10,878,067 B2

PHYSICAL ACTIVITY AND IT ALERT CORRELATION

RELATED APPLICATION

This application claims the benefit of priority under 35 USC § 119(e) of U.S. Provisional Patent Application No. 62/531,986, filed on 13 Jul. 2017, the contents of which are incorporated herein by reference in their entirety.

BACKGROUND

The present invention, in some embodiments thereof, relates to validating access events related to accesses to client terminals deployed in a monitored location, and, more specifically, but not exclusively, to validating access events for accessing network resources via client terminals deployed in a monitored location by correlating between the access events and activity patterns of people detected in the monitored location.

Cyber-attacks and cybercrime present a major and ever growing concern for any organization reliant on Information Technology (IT).

Of the various types of attacks, those termed "Advanced Persistent Threats" are particularly difficult to prevent or detect. They revolve around the potential attacker first gaining access to one machine inside the organization network through one or more techniques, for example, a Phishing attack, a malicious web page code and/or the like.

Once control of one machine is achieved, the attacker may study the IT network, looking for security loopholes in other machines and trying to gain access to network resources, to user passwords, credentials and/or the like. This phase may take hours, days or months and is particularly difficult to detect since the malicious operations may be done inside the organization network with seemingly authorized access.

SUMMARY

According to a first aspect of the present invention there is provided a computer implemented method of correlating between detected access events to access client terminals in a monitored location and physical activity of people in the monitored location, comprising:

Detecting one or more access events to access one or more of a plurality of client terminals located in a monitored location and operatively connected to a first network.

Obtaining sensory activity data from one or more activity detectors deployed in the monitored location to capture physical activity of people in the monitored location. The activity detector(s) are operatively connected to a second interconnection isolated from the first network.

Analyzing the sensory activity data to identify a spatiotemporal activity pattern of one or more persons in the monitored location.

Correlating between the access event(s) and the spatiotemporal activity pattern(s) to validate the access event(s).

Initiating one or more actions according to the validation.

Correlating between the detected access event(s) and the captured actual physical activity of persons detected in the monitored location may significantly improve characterization of the access event(s) to improve detection of real invalid access events while reducing false positive detections in which valid access events are classified as invalid access events. Moreover, the client terminals and the activity detectors are connected through networks completely isolated from each other.

Therefore correlating the two domains together, detection of potential cyber security threats, risks and/or attacks may be significantly improved. Furthermore, the physical isolation of the networks may enable improved protection of the activity detectors from hacking as they reside on a closed communication segment having none and/or limited accessibility from remote locations. In addition, using the activity detectors may require little and/or no costs, effort and/or the like since the activity detectors used herein may typically already be deployed in many facilities, for example, organizations, institutions and/or the like.

According to a second aspect of the present invention there is provided a system for correlating between detected access events to access client terminals in a monitored location and physical activity of people in the monitored location, comprising one or more activity detectors deployed in monitored location and one or more processors coupled to a plurality of client terminals through a first network and to the one or more activity detectors through a second interconnection isolated from the first network. The processor(s) are adapted to execute code, the code comprising:

Code instructions to detect one or more access events to access one or more of the plurality of client terminals.

Code instructions to obtain sensory activity data from one or more activity detectors deployed in the monitored location to capture physical activity of people in the monitored location.

Code instructions to analyze the sensory activity data to identify a spatiotemporal activity pattern of one or more persons in the monitored location.

Code instructions to correlate between the one or more access events and the spatiotemporal activity pattern to validate the one or more access events.

Code instructions to initiate one or more actions according to the validation.

According to a third aspect of the present invention there is provided a software program product for correlating between detected access events to access client terminals in a monitored location and physical activity of people in the monitored location, comprising A non-transitory computer readable storage medium.

First program instructions for detecting one or more access events to access one or more of a plurality of client terminals located in a monitored location and operatively connected to a first network.

Second program instructions for obtaining sensory activity data from one or more activity detectors deployed in the monitored location to capture physical activity of people in the monitored location. The activity detector(s) are operatively connected to a second interconnection isolated from the first network.

Third program instructions for analyzing the sensory activity data to identify a spatiotemporal activity pattern of one or more persons in the monitored location.

Fourth program instructions for correlating between the one or more access events and the spatiotemporal activity pattern to validate the one or more access events.

Fifth program instructions for initiating one or more actions according to the validation.

Wherein the first, second, third, fourth and fifth program instructions are executed by one or more processors from the non-transitory computer readable storage medium.

In a further implementation form of the first, second and/or third aspects, the correlation is done by comparing spatiotemporal data relating to the one or more access events with the spatiotemporal activity pattern. The correlation between the access event and the activity pattern may be done by analyzing the physical activity that may be required to invoke and/or initiate the detected access event and comparing it to actual physical activity of persons detected in the monitored location.

In an optional implementation form of the first, second and/or third aspects, the detection includes detecting one or more access events to one or more network resources in which the network resource(s) are accessed via the client terminal(s). The one or more network resources are members of a group consisting of: a network, a storage resource, a service and an application. Typically, organizations provide multiple network resources, services and/or the like which are accessible through the client terminals. Expanding the detection of access events to access the network resources may therefore significantly improve protection of the organization network and of the network resources connected to it beyond protection of the client terminals themselves.

In a further implementation form of the first, second and/or third aspects, the one or more access events are members of a group consisting of: a login attempt to the one or more client terminals, installation of a software module on the one or more client terminals, a manual interaction with the one or more client terminals, an increase in utilization of computing resources at the one or more client terminals and an access attempt to one or more network resources. The ability to detect a wide range of access events may significantly improve the ability to validate access events to the client terminals and/or to the network resources thus significantly improving the ability to protect the organization network.

In a further implementation form of the first, second and/or third aspects, one or more of the activity detectors are motion sensors capturing motion of the one or more persons. Motion sensors are typically low cost, easy to deploy and often already deployed in many monitored locations. Using the motion sensors may therefore require little and/or no effort, cost and/or other expenditures.

In a further implementation form of the first, second and/or third aspects, one or more of the activity detectors are presence sensors capturing a presence of the one or more person. Presence sensors are typically low cost, easy to deploy and often already deployed in many monitored locations. Using the presence sensors may therefore require little and/or no effort, cost and/or other expenditures.

In a further implementation form of the first, second and/or third aspects, one or more of the activity detectors are imaging sensors capturing one or more of a motion, a presence and an activity of the one or more persons. Imaging sensors are typically low cost, easy to deploy and often already deployed in many monitored locations. Using the imaging sensors may therefore require little and/or no effort, cost and/or other expenditures. Moreover, the imaging sensors may provide extensive sensory data which may be analyzed to detect detailed physical activity of the person(s) in the monitored location.

In a further implementation form of the first, second and/or third aspects, one or more of the activity detectors are acoustic sensors capturing: a sound of a typing on a keyboard of the one or more client terminals, a plug insertion/ejection to the one or more client terminals, a peripheral device insertion/ejection to the one or more client terminals and/or a mechanical operation to the one or more client terminals. The acoustic sensors may provide sound sensory data which may not be easily captured by other sensors, in particular, motion, presence and/or imaging sensors. The sound sensory data may be analyzed to infer, identify and/or determine of physical activity(s) indicated by the captured sound sensory data.

In a further implementation form of the first, second and/or third aspects, one or more of the activity detectors are Human-Machine Interface (HMI) monitoring sensors capturing: a keyboard typing on a keyboard of the one or more client terminals, a movement of a pointing device of the one or more client terminals, a plug insertion/ejection to the one or more client terminals, a peripheral device insertion/ejection to the one or more client terminals and/or a mechanical operation to the one or more client terminals. The HMI sensors may provide sensory activity data which may not be easily captured by other sensors, in particular, motion, presence and/or imaging sensors. The sound sensory data of the HMI sensors may be highly accurate as it is obtained by monitoring the actual HMI interfaces of the client terminals.

In an optional implementation form of the first, second and/or third aspects, at least some of the sensory activity data is received from the one or more activity detectors through one or more another activity detectors, the one or more activity detectors generates an indication indicating of the physical activity, the indication is captured by the one or more another activity detectors which forwards the indication. Using one or more of the activity detectors (e.g. an imaging sensor) to capture indications (e.g. visual indications) from other activity sensor(s) which may not be connected to the (second) infrastructure may significantly reduce effort and/or cost in deploying activity detectors in the monitored location.

In a further implementation form of the first, second and/or third aspects, a physical location of one or more of the activity detectors is mapped in the monitored location. Availability of the physical location, positioning and/or other deployment information of the activity sensors in the monitored location may be essential for correlating between the detected access events and the activity patterns. This is due to the fact that mapping the physical activity(s) in the monitored location, in particular with respect to client terminal(s) accessed during the detected access event(s) may be imperative for the correlation.

In a further implementation form of the first, second and/or third aspects, a physical location of one or more of the client terminals is mapped in the monitored location. Availability of the physical location, positioning and/or other deployment information of the client terminals in the monitored location may be essential for correlating between the detected access events and the activity patterns. This is due to the fact that mapping the actual location of the accessed client terminal(s), in particular with respect to the detected physical activity(s) may be imperative for the correlation.

In an optional implementation form of the first, second and/or third aspects, the analysis comprises analyzing location data associated with the one or more persons to identify the spatiotemporal activity pattern, the location data is collected from one or more wearable activity detectors carried by the one or more persons. Some organizations and/or monitored locations enforce a location sensor policy requiring all authorized persons in the monitored location to carry wearable activity detectors (personal and/or non-personal), in particular location sensors. Analyzing the location data collected from the wearable activity detectors may significantly improve characterizing the physical activity detected in the monitored location and identifying the activity patterns.

In an optional implementation form of the first, second and/or third aspects, an operational status of one or more of the client terminals is identified. Some client terminal may report their operational status. The operational status may be analyzed in conjunction with the sensory activity data to improve the correlation of the access event(s) with the detected activity pattern(s), in particular to identify feasibility of locally initiating the detected access event at the accessed client terminal(s).

In a further implementation form of the first, second and/or third aspects, the spatiotemporal activity pattern comprises one or more members of a group consisting of: a presence, a duration of presence, a movement, a path of movement, a duration of movement, a presence of another person and a physical interaction with the client terminal. Collecting a wide range and variety of activity data and creating the activity pattern(s) on the activity data may significantly improve the accuracy, scope and/or validity of the physical activities detected by persons in the monitored location. This in turn may significantly increase the ability and/or reliability of the correlation between the detected access event(s) and the identified activity pattern(s).

In a further implementation form of the first, second and/or third aspects, the validation is evaluated by analyzing the spatiotemporal activity pattern of the one or more persons to evaluate whether the one or more persons is in in an operational proximity to the one or more client terminals to initiate the one or more access events. Evaluating the feasibility (i.e. the operational proximity) of the person(s) to actually locally initiate the detected access event(s) may serve as major criteria for the correlation between the detected access event(s) and the identified activity pattern(s). Naturally, in case a detected person is out of the operational proximity from the accessed client terminal, the activity pattern associated with the detected person may not be correlated with the detected access event.

In an optional implementation form of the first, second and/or third aspects, the analysis comprises analyzing the sensory activity data to determine one or more of: a posture, a direction and/or an orientation of the one or more persons. Identifying the further characteristics of the person and including them in the respective activity pattern may significantly improve the accuracy and/or reliability of the correlation. Identifying the posture, direction and/or orientation of the detected person may increase ability to determine whether the detected person is within the operational proximity to the accessed client terminal.

In a further implementation form of the first, second and/or third aspects, the validation is evaluated by comparing the activity pattern of the one or more persons to one or more predefined activity patterns to identify a suspicious activity of the one or more persons with respect to the one or more access events. Comparing the identified activity pattern(s) to predefined activity patterns may significantly increase detection of suspicions and potentially malicious activities of the persons detected in the monitored location since deviation from the predefined activity patterns may be easily identified.

In a further implementation form of the first, second and/or third aspects, the validation is evaluated by comparing the activity pattern of the one or more persons to the activity pattern of one or more other persons to identify a suspicious activity of the one or more persons with respect to the one or more access events. Comparing the identified activity pattern of one or more persons detected in the monitored location to the activity pattern(s) of other persons detected in the monitored location may allow detecting unusual, unordinary, suspicions and potentially malicious activities of some of the persons in the monitored location compared to other persons.

In a further implementation form of the first, second and/or third aspects, the one or more actions is a member of a group consisting of: generating an alert, preventing the access to the one or more client terminals, preventing the access to one or more network resources and/or invoking a deception measure. Based on the validation of the access event(s) a plurality of actions may be taken in order to alert one or more parties of the suspected invalid access, take protection measures to block the potential attack, take protection measures to deceive and/or contain the potential attack in a closed controlled environment and/or the like. This may allow increased flexibility in responding to invalid access event which may be indicative of a potential cyber-attack.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
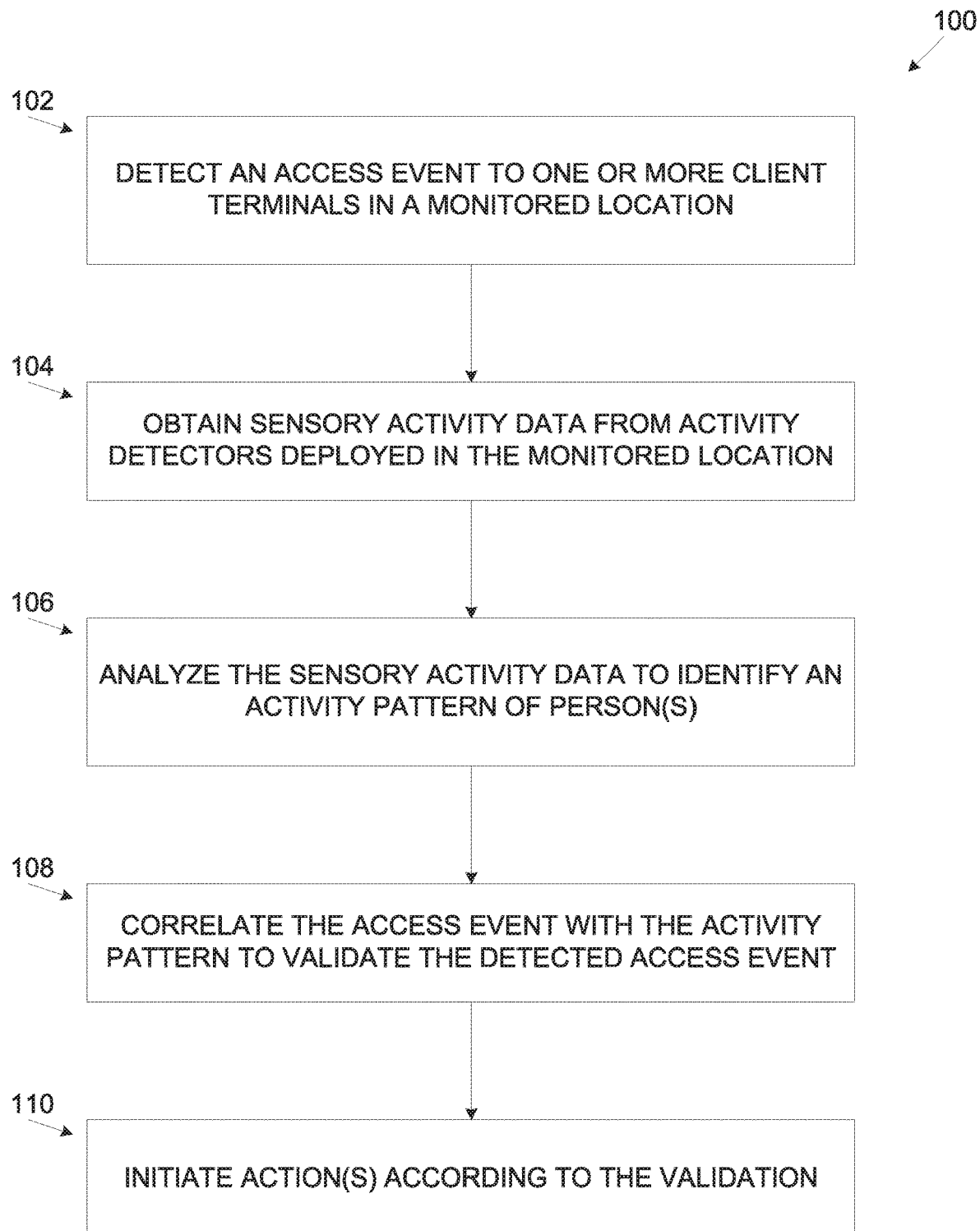
FIG. 1 is a flowchart of an exemplary process of correlating between access events to access client terminals in a monitored location and activity patterns of people in the monitored location, according to some embodiments of the present invention.

The present invention, in some embodiments thereof, relates to validating access events related to accesses to client terminals deployed in a monitored location, and, more specifically, but not exclusively, to validating access events for accessing network resources via client terminals deployed in a monitored location by correlating between the access events and activity patterns of people detected in the monitored location.

According to some embodiments of the present invention, there are provided methods, systems and computer program products for correlating between IT events, in particular access events for accessing one or more client terminals located in a monitored location and physical activity of one or more persons in the monitored location in order to evaluate a validity of the access events. The client terminals may include, for example, a processing node (e.g. a computer, a laptop, a server, a mobile device and/or any processing device) and/or the like. Moreover, the detected access events may relate to accesses to one or more network resources, for example, a network, a storage resource, a service, a router, a gateway, a printer and/or the like via the client terminal(s). The client terminal(s) may communicate with each other as well as with other internal or external network resources through a (first) network comprising one or more networks.

The monitored location may be monitored by activity detectors, for example, stationary activity detectors (e.g. a motion sensor, a presence sensor, an imaging sensor, etc.), dynamic activity detectors (e.g. a wearable sensor, etc.) and/or the like which may capture spatiotemporal activity of persons in the monitored location. The activity detectors may further include one or Human-Machine Interface (HMI) monitoring sensors, for example, an acoustics sensor, a tactile sensor and/or the like which may capture interaction activity of the persons with the client terminals, for example, typing a keyboard, moving a pointing device, inserting/ejecting a cable plug (e.g. a network cable), a peripheral device (e.g. a Universal Serial Bus (USB)) and/or the like. In order to maintain isolation between the activity detectors and the client terminals as well as the network resources, the activity detectors may connect to a (second) interconnection which is physically isolated, for example, segregated, separated and/or independent of the first network connecting the client terminals and the network resources. For example, the first network may be facilitated through one or more Local Area Networks (LAN), Wide Area Network (WAN) and/or the like, while the second interconnection may include, for example, a Bluetooth network, an isolated WLAN (e.g. Wi-Fi), a Controller Area Network (CAN) bus and/or the like.

A monitoring system connected to the first network may monitor network activity on the first network to detect access events for accessing one or more of the client terminals. The detected access events may include, for example, a login attempt to the client terminal(s), an installation of a software module on the client terminal(s), an attachment of an external device to the client terminal(s), a manual interaction with the client terminal(s), an increment in computing resources utilization at the client terminal(s) and/or the like. The monitoring system may further detect access event relating to accesses to the network resources via one or more of the client terminals, for example, accessing a storage resource (e.g. a database, a file, etc.), accessing a service (e.g. a local service, a cloud service, etc.), using a printer and/or the like.

The monitoring system may collect sensory activity data from one or more of the activity detectors. The monitoring system may collect the sensory activity data continuously or periodically and/or upon detection of access event(s). The monitoring system may further collect sensory activity data presenting interaction activity of the person(s) with one or more of the client terminals, for example, typing on a keyboard, moving a pointing device, opening a server door, attaching a USB peripheral device, inserting a network cable plug and/or the like. The collected sensory activity data may include and/or be associated with timing of the captured activity of the person(s), for example, a time, an order, a sequence and/or the like.

The monitoring system may analyze the sensory activity data to identify one or more activity patterns describing (portraying) a spatiotemporal activity of one or more persons in the monitored location, for example, a timing, a presence, a duration of the presence, a movement, a path of movement, duration of the movement, presence of other person(s) and a physical interaction with the network resource(s).

The monitoring system may obtain mapping information mapping a physical location of each of the activity detectors with respect to a structural layout and/or perimeter of the monitored location. The mapping information may include, for example, a location, an elevation, an orientation, a Field of View (FOV), a range, a resolution and/or any other locational data for each activity detector. Similarly, the monitoring system may obtain mapping information for one or more of the client terminals such that the physical location of the client terminal(s) is known with respect to the structural layout and/or perimeter of the monitored location.

Based on the identified activity pattern(s), the monitoring system may correlate between the spatiotemporal physical activity and optionally the interaction activity of person(s) detected in the monitored location and the location and timing of the client terminal(s) accessed and/or used during the access event(s). Based on the correlation, the monitoring system may evaluate whether to validate, authenticate and/or approve the detected access event(s) or no to validate these access event(s) which may present, for example, potential (cyber) security threats. The validity may be based on one or more validation rules, for example, rules for evaluating a capability of a certain person(s) detected in the monitored location to actually access the accessed networked resource. The validation rules may further include rules for comparing the activity pattern of the detected person(s) to predefined activity pattern(s), comparing the activity pattern of the detected person(s) to activity patterns of other person(s) detected in the monitored location and/or the like. Optionally, one or more machine learning techniques and/or algorithms may be applied to learn of typical activity patterns of one or more of the user occupying the monitored location in order to create predefined activity patterns to be used as basis for legitimate (valid) physical activity.

Applying these validation rules and/or learned activity patterns, the monitoring application may evaluate the validity of the detected access event(s) based on positive and/or negative correlation. Negative correlation relates to detected access event(s) which cannot be correlated to the physical activity of any of the person(s) currently present and detected in the monitored location. This may be indicative that the access event(s) are initiated from a remote location and/or by automated application executing at the accessed client terminal(s) and may therefore present a potential security threat. Positive correlation relates to detected access event(s) which may be correlated with one or more person(s) in the monitored location which may exhibit out of ordinary, suspicious and/or unauthorized activity which may also be indicative of a potential security threat.

According to the evaluation of the detected access event(s), in case the monitoring system evaluates the access event(s) is invalid and hence may present a potential security threat, the monitoring system may initiate one or more actions, for example, generate an alert to one or more users and/or automated systems, prevent the access to the client terminal(s), prevent the access to the accessed network resource(s), invoke a deception measure to contain the access event and/or the like.

Validating the access events to the client terminal in the monitored location based on correlation between the detected access events and the physical activity of persons detected in the monitored location may present significant advantages. First, typically, the client terminals (as well as the network resources) and the activity detection resources are completely isolated from each other. Therefore by correlating the two domains together, detection of potential cyber security threats, risks and/or attacks may be significantly improved.

Moreover, by correlating between the detected access event(s) and the captured actual physical activity of persons detected in the monitored location may significantly improve characterization of the access event(s) to improve detection of real invalid access events while reducing false positive detections in which valid access events are classified as invalid access events. Moreover, since many cyber-attacks may be initiated either from remote locations and/or using automated software application executing at the attacked client terminal(s), detecting that no person is actually in operational proximity to the accessed network resource(s) (negative correlation) may significantly increase the certainty that the detected access event is a malicious one. Also by comparing the activity patterns of the person(s) correlated with the detected access event(s) in the monitored location with predefined activity patterns and/or with activity patterns of other person(s) in the monitored location, may allow detection of unordinary, suspicious and/or unauthorized physical activity of the person(s).

Furthermore, by physically separating (isolating) the activity detectors interconnection from the client terminals network deployed in the monitored location for use by the network resources, the activity detectors may be better protected from hacking as they reside on a closed communication segment having none and/or limited accessibility from remote locations. In addition, validation of the access events through the correlation with the physical activity may require little effort as the activity detectors used herein are typically already deployed in many facilities, for example, organizations, institutions and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of correlating between access events to access client terminals in a monitored location and activity patterns of people in the monitored location, according to some embodiments of the present invention. A process 100 may be executed to correlate between IT events such as access events for accessing one or more client terminals located in a monitored location monitored by a plurality of activity detectors and physical activity of one or more persons in order to validate the access events. The client terminals, for example, processing nodes (e.g. computers, laptops, servers, mobile devices and/or any processing device) and/or the like may communicate with each other as well as with other internal and/or external network resources (e.g. storage resources, services, etc.) through a (first) network facilitated through one or more networks. In order to enforce isolation between the activity detectors and the client terminals and the network resources, the activity detectors may connect to a second interconnection physically isolated, segregated separated and/or independent of the first network connecting the client terminals and the network resources. A physical location of the client terminals as well as the physical location of the activity detectors may be mapped such that their location is known.

Access events for accessing one or more of the client terminals and/or for accessing one or more of the network resources via the client terminal(s) may be detected by monitoring traffic and/or activity on the first network. The detected access events may include, for example, a login attempt to the client terminal(s), installation of a software module on the network resource(s), an attachment of an external device to the network resource(s), a manual interaction with the client terminal(s), an increase in computing resources utilization at the client terminal(s) and/or the like. The detected access events may further include access events relating to accesses to the network resources via the client terminal(s), for example, accessing a storage resource (e.g. a database, a file, etc.), accessing a service (e.g. a local service, a cloud service, etc.), using a printer and/or the like.

Sensory activity data may be provided by one or more of the activity detectors (e.g. presence sensors, motion sensors, imaging sensors, etc.) deployed in the monitored location. Collecting the sensory activity data may be done continuously, periodically and/or the sensory activity data collection may be triggered by the detection of one or more access events. The sensory activity data may be analyzed to identify one or more activity patterns describing (portraying) a spatiotemporal physical activity of one or more persons in the monitored location, for example, a timing (time, order, sequence, etc.), a presence, duration of the presence, a movement, a path of movement, duration of the movement, presence of other person(s) and a physical interaction with the network resource(s). The sensory activity data may further include captured interaction activity of the person(s), for example, keyboard typing, pointing device movement, peripheral device attach/detach and/or the like provided by one or more interaction sensor (e.g. acoustic sensors, HMI interaction sensors, etc.). The interaction activity data may be analyzed to identify and/or enhance the activity pattern(s) of the detected person(s).

Based on the identified activity pattern(s), the spatiotemporal activity and optionally the interaction activity of the person(s) may be correlated with the client terminal accessed during the access event(s) to evaluate whether the detected access event(s) is valid or whether the access event(s) is invalid and may thus present a potential (cyber) security threat. The evaluation may be based on one or more validation rules and/or learned activity patterns, for example, evaluation of a capability of the detected person(s) to actually access the accessed client terminal correlated with the detected access event(s), comparing the activity pattern to predefined activity patterns, comparing the activity pattern to activity patterns of other person(s) and/or the like. Based on to the validation outcome, one or more actions may be initiated, for example, generating an alert to one or more users and/or automated systems, preventing the access to the accessed client terminal(s), preventing the access to the accessed network resource(s), invoking a deception measure to contain the access event and/or the like.

Figure 2:
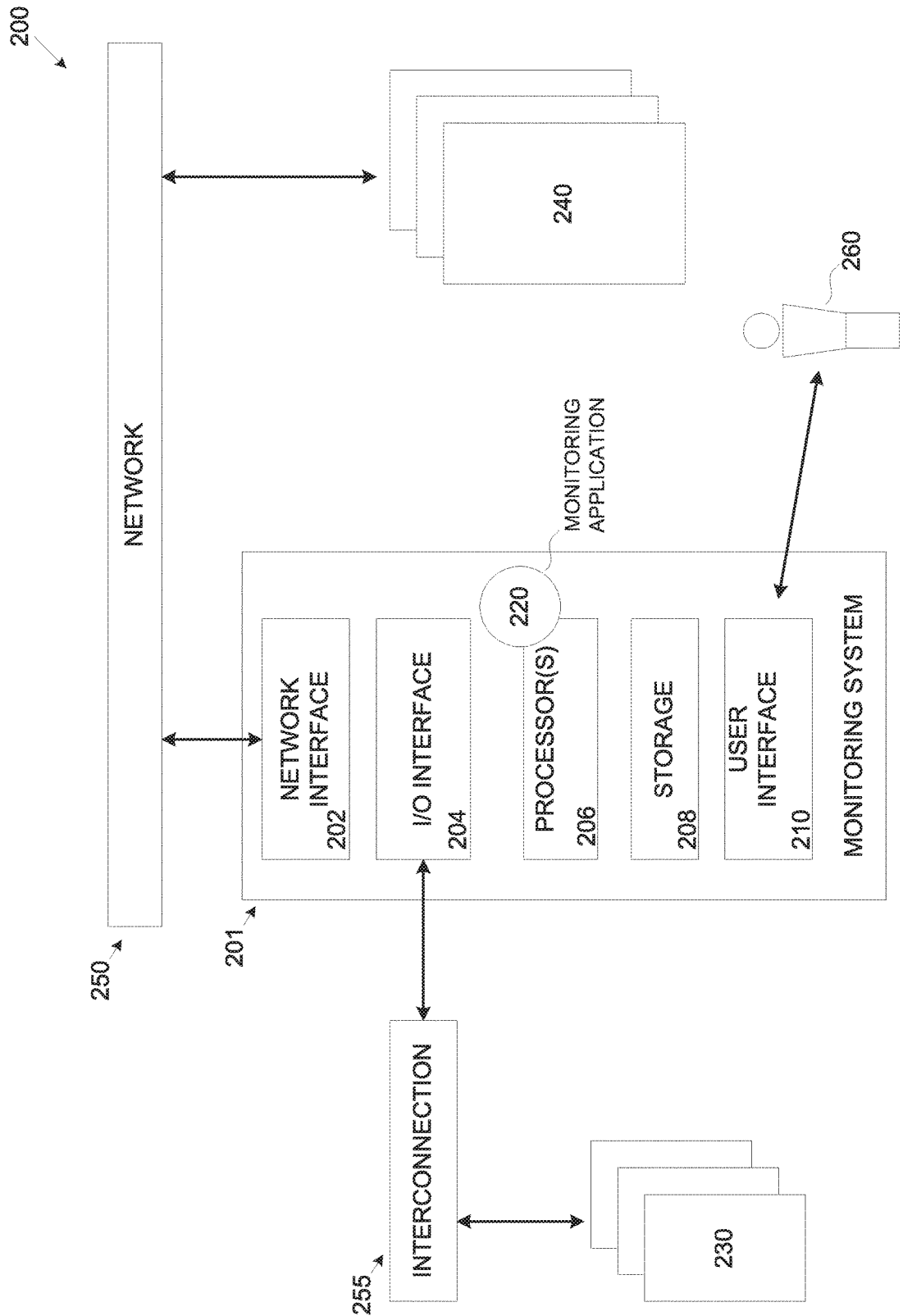
FIG. 2 is a schematic illustration of an exemplary system for correlating between access events to access client terminals in a monitored location and activity patterns of people in the monitored location, according to some embodiments of the present invention.

Reference is also made to FIG. 2, which is a schematic illustration of an exemplary system for correlating between access events to access client terminals in a monitored location and activity patterns of people in the monitored location, according to some embodiments of the present invention. An exemplary system 200 for executing a process such as the process 100 may comprises a plurality of client terminals 240, for example, a processing node, a computer, a laptop, a server, a mobile device (e.g. a tablet, a cellular device, a Smartphone, etc.), and/or any processing device having one or more processor.

The plurality of client terminals 240 may connect to one or more wired and/or wireless networks 250 (also designated as first network), for example, a Local Area Network (LAN) and/or the like to communicate with each other. The network 250 may further include additional networks, for example, a Wide Area Network (WAN), a Personal Area Network (PAN), a Metropolitan Area Network (MAN) and/or the internet to facilitate communication with more or more internal and/or external network resources, for example, a storage resource, a service, a router, a gateway, a printer and/or the like which are located on-site and/or off-site the monitored location respectively.

The system 200 further includes a monitoring system 201 comprising a network interface 202 for connecting to the (first) network 250, an Input/output (I/O) interface 204 for connecting to an interconnection 255 (also designated as second interconnection), a processor(s) 206 and storage 208. The processor(s) 206, homogenous or heterogeneous, may include one or more processors arranged for parallel processing, as clusters and/or as one or more multi core processor(s). The storage 208 may include one or more non-transitory persistent storage devices, for example, a hard drive, a Flash array and/or the like. The storage 208 may further comprise one or more network storage devices, for example, a storage server, a network accessible storage (NAS), a network drive, and/or the like. The storage 208 may also include one or more volatile devices, for example, a Random Access Memory (RAM) component and/or the like.

The storage 208 may store one or more software modules, for example, an OS, an application, a tool, an agent, a service, a script and/or the like each comprising a plurality of program instructions that may be executed by the processor(s) 206 from the storage 208. The processor(s) 206 may execute a monitoring application 220 for monitoring and validating access events to the network resources 240. Optionally, the monitoring system 201 is utilized by one or more remote platforms, for example, a remote server, a cloud computing platform, such as, for example, Amazon Web Service (AWS), Google Cloud, Microsoft Azure and/or the like. Additionally, and/or alternatively, the monitoring application 220 may be implemented as one or more remote services, a remote service, a cloud service, Software as a Service (SaaS), a Platform as a Service (PaaS) and/or the like.

The I/O interface 202 may include one or more wired and/or wireless interfaces, for example, a Radio Frequency (RF) interface, a Bluetooth interface, a Wireless LAN (Wi-Fi) interface, a Controller Area Network (CAN) bus interface, a serial interface, a single wire interface and/or the like for connecting to the interconnection 255 to communicate with one or more activity detectors 230. In particular, in order to maintain isolation between the activity detectors 230 and the network resources 240, the activity detectors 230 may connect to the (second) interconnection 255 which is physically isolated, for example, segregated, separated and/or independent of the network 250 connecting the client terminals 240 and the network resources. For example, while the network resources 240 may typically connect to the network 250, the activity detectors 230 may connect to the monitoring system 201 through the interconnection 255 comprising one or more interfaces, networks, buses and/or interconnections provided by the I/O interface 202, for example, the CAN bus, the Bluetooth interface, the RF and/or the like. The activity detectors 230 may utilize a point to point connection with the I/O interface 202 and/or the activity detectors 230 may share the interconnection 255.

The activity detectors 230 may be configured to capture spatiotemporal activity of one or more persons. The activity detectors 230 may include one or more stationary detectors, for example, a motion sensor (e.g. a passive infrared (PIR) sensor, a microwave (MW) sensor, etc.), a presence sensor, an imaging sensor, an acoustic sensor and/or the like.

Optionally, the activity detectors 230 include one or more Human-Machine Interface (HMI) monitoring sensors, for example, a tactile sensor, an acoustic sensor and/or the like. The HMI monitoring sensors may detect and/or capture manual interaction of one or more persons with an HMI of one or more of the client terminals 240, for example, keyboard typing, movement of a pointing device (e.g. a mouse, a touch pad, etc.), cable plug-in/plug-out (e.g. network cable, etc.), peripheral device (e.g. USB device, etc.) attachment/detachment, server door open/close and/or the like. The activity detectors 230 may further include one or more plug presence sensors attached to ports, interfaces and/or mechanical elements of the client terminals 240, for example, a USB port, an Ethernet port, a server door, a laptop lid and/or the like to detect manual activity with the ports and/or I/O interfaces, for example, cable plug-in/plug-out (e.g. network cable, etc.), accessory device (e.g. USB device, etc.) attachment/detachment and/or the like.

The activity detectors 230 may also include one or more dynamic detectors, for example, a wearable location sensor which may be carried by one or more person(s) and provide location data and/or indication of the associated person(s). The wearable activity detector 230, for example, a tag card, a bracelet, a key chain and/or the like may be uniquely associated with a certain person such that identification (ID) of the associated person is known. However, the wearable activity detector 230 may also be generic such that the wearable activity detector 230 may provide location information of the person carrying it but may not provide unique association (identification) with the carrying person. For example a plurality of people working in the monitored location may be issued a generic wearable activity detector 230 which may provide the location information of the people while not identifying them personally.

While each of the activity detectors 230 may directly connect and/or communicate with the monitoring system 201 through the through the interconnection 255, one or more of the activity detectors 230 may communicate its activity indication indirectly to the monitoring system 201 through one or more other activity detectors 230. This means that upon physical activity detection one or more of the activity detectors 230 may generate an indication of that physical activity, that indication may be captured by one or more other activity detectors 230 (directly connected to the monitoring system 201) and forwarded (relayed) by these directly connected activity detector(s) 230 to the monitoring system 210. For example, while the HMI monitoring sensors may be directly connected to the monitoring system 201 through the I/O interface 202, the HMI monitoring sensors may optionally generate an indication which may be captured by one or more other stationary detectors which in turn may forward the activity indication to the monitoring system 201. For example, a keyboard typing sensor may generate a visual indication (e.g. flashing a Light Emitting Diode (LED), a sound indication and/or the like which may be captured by the imaging sensor(s) and/or by the acoustic sensor(s) respectively and forwarded by the imaging sensor(s) and/or by the acoustic sensor(s) to the monitoring system 201. In another example, a USB port may include a plug presence sensor which may flash a LED while a USB device is plugged in the port. The LED indication may be captured by one or more of the imaging sensor and forwarded to the monitoring system 201.

Optionally, the monitoring system 201 includes a user interface 210 for interacting with one or more user 260, for example, an Information Technology (IT) officer, an administrator, an operator and/or the like. The user interface 210 may include one or more human-machine interfaces, for example, a keyboard, a pointing device, a touch pad, a display, a touch screen, an audio interface and/or the like for interacting with the user(s) 260. For example, the user interface 208 may be used to present the user(s) 260, for example, a Graphic User Interface (GUI) utilized through one or more of the human-machine interfaces. Naturally, in case the monitoring system 201 is implemented through the remote platform(s) and/or the remote service(s), the monitoring system 201 may be accessible from one or more local client terminals, for example, the processing node using one or more access agents, for example, a web browser, a proprietary local agent of the remote service and/or the like.

Figure 3:
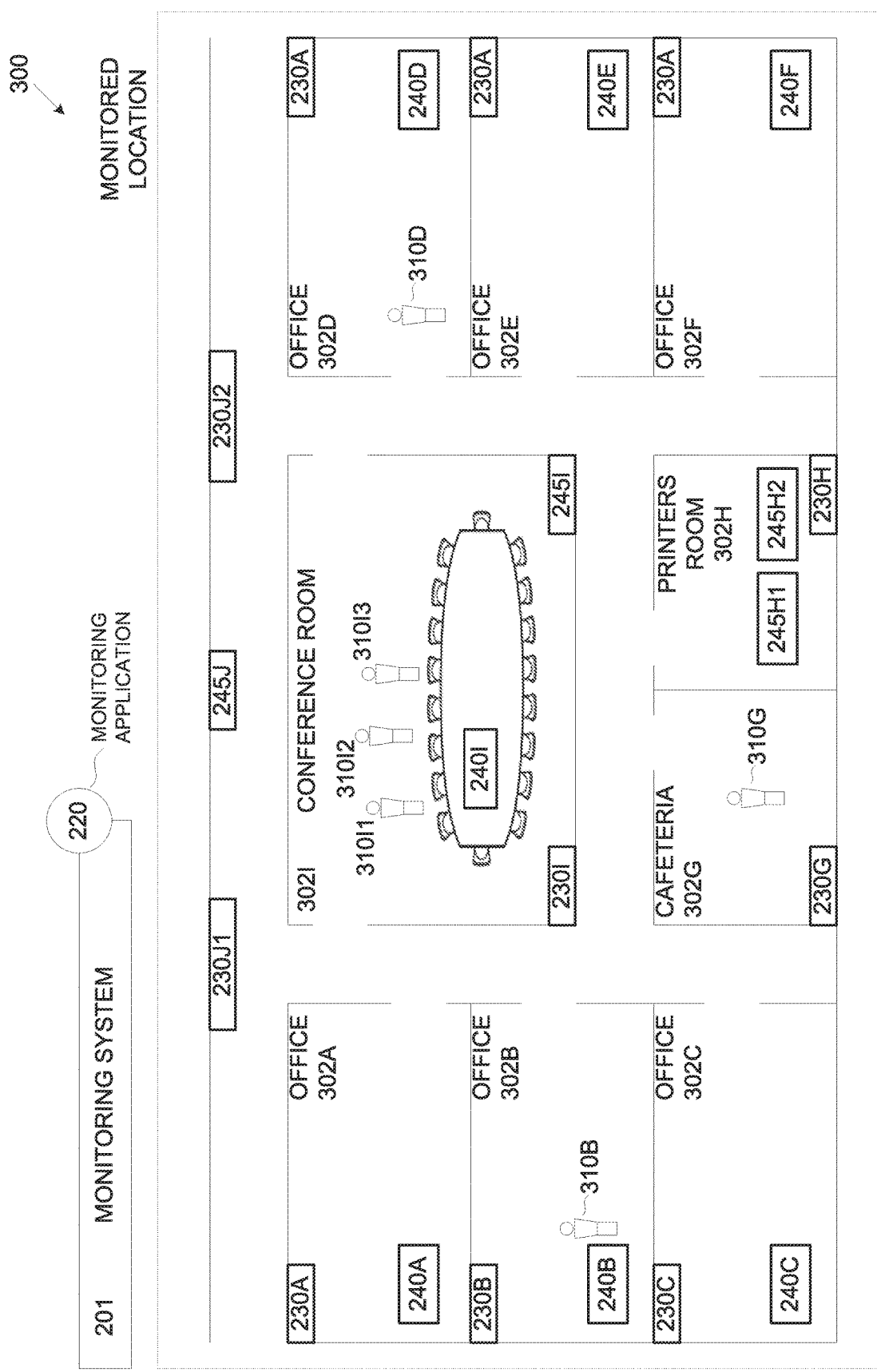
FIG. 3 is a schematic illustration of an exemplary monitored location deployed with a system for correlating between access events to access client terminals in the monitored location and activity patterns of people in the monitored location, according to some embodiments of the present invention.

Reference is now made to FIG. 3, which is a schematic illustration of an exemplary monitored location deployed with a system for correlating between access events to access client terminals in the monitored location and activity patterns of people in the monitored location, according to some embodiments of the present invention. An exemplary monitored location 300, for example, an organization facility, an institution facility, a secure facility and/or the like may be deployed with a system such as the system 200. The monitored location 300 may be composed of a plurality of at least partially distinct areas 302, for example, rooms, offices, public areas, corridors, conference rooms, open spaces, lobbies, recreation rooms and/or the like. The exemplary monitored location 300 may include, for example, offices 230A-230F, a conference room 302I, a cafeteria 302G and a printers room 302H.

A plurality of client terminals such as the client terminals 240 may be located in one or more of the areas 302 in the monitored location 300. The client terminals 240 may include, for example, private processing nodes 240A-240F (240A, 240B, 240C, 240D, 240E and 240F) located in the offices 302A-302F (302A, 302B, 302C, 302D, 302E and 302F) respectively, and a public processing node 240I located in the conference room 302I. The physical location of one or more of the client terminals 240 in the monitored location 300 may be mapped and available through mapping information such that the location of the network resources 240 in the monitored location 300 is known.

The mapping information may be correlated with structural information of the monitored location 300 and may include, for example, a location in the monitored location 300, an area 302 in which the client terminals 240 is located and/or the like. The mapping information may further include additional mapping data, for example, an exact location of the client terminals 240 in the area 302, an orientation of the client terminals 240, a location of the HMI of the client terminals 240 and/or the like. One or more network resources may also be located in the monitored location 300, for example, a printer 245H1 and a printer 245H2 located in the printers room 302H, a wireless network access point 245I located in the conference room 302I and a wired network switch 245J located in a public area corridor. One or more additional network resources, for example, a storage resource, a service, a cloud service and/or the like may be accessible through one or more of the processing nodes 240A-240F and/or 240I.

A plurality of activity detectors such as the activity detectors 230 may be deployed in the monitored location 300 to capture physical activity of one or more persons 310 in the monitored location 300. The activity detectors 230 may include one or more stationary activity detectors, for example, a presence sensor, a motion sensor, an imaging sensor, an acoustic sensor and/or the like which may be deployed in one or more of the monitored location areas 302 to capture physical activity of people in the monitored location 300. The activity detectors 230 may be located to monitor specific areas 320 in order to capture the people's activity in specific areas 302. In particular, an activity detector 230A may be placed in the office 302A, an activity detector 230B may be placed in the office 302B, an activity detector 230C may be placed in the office 302C, an activity detector 230D may be placed in the office 302D, an activity detector 230E may be placed in the office 302E and an activity detector 230F may be placed in the office 302F. Similarly, an activity detector 230G may be placed in the cafeteria 302G, an activity detector 230H may be placed in the printers room 302H and an activity detector 230I may be placed in the conference room 302I.

Additionally and/or alternatively one or more activity detectors 230, in particular stationary activity detectors may be deployed in one or more public area corridors such that the activity detectors 230 monitor the corridors and/or entrances/exits of the specific areas 302 such as the offices 302A-302F, the conference room 302I, the cafeteria 302G and/or the printers room 302H. Based on the sensory activity data received from the activity detector(s) 230 deployed in the public area, a monitoring applications such as the monitoring application 220 may estimate presence of one or more persons in the specific areas 320 by analyzing entries and/or exits of the persons in and/or out of the specific areas 320 as depicted by the public area deployed activity detector(s) 230.

The physical location of one or more of the activity detectors 230 in the monitored location 300 may be mapped and available through mapping information such that the location of the activity detectors 230 in the monitored location 300 is known. The mapping information may be correlated with the structural information of the monitored location 300 and may include, for example, a location (e.g. coordinates) in the monitored location 300, an area 302 in which the activity detector 230 is located and/or the like. The mapping information may further include additional mapping data of the respective activity detector 230, for example, an elevation, an orientation, a Field of View (FOV), a range, a resolution and/or the like.

Optionally, the activity detectors 230 in the monitored location 300 include one or more of the dynamic activity detectors which may be issued to one or more of the persons 310 in the monitored location 300, for example, a person 310B, a person 310D, a person 310G, a person 310I1, a person 310I2, and/or a person 310I3. The dynamic activity detectors 230 may be generic (same for all persons 310) and/or uniquely associated with the respective persons 310 carrying the dynamic activity detectors 230.

The monitoring system 201 executing a monitoring application such as the monitoring application 220 may be applied to correlate between IT events, in particular access events to the client terminals 240 in the monitored location 300 and activity patterns describing spatiotemporal activity and optionally HMI interaction activity of one or more of the users 310 in the monitored location 300. As presented herein above, the monitoring system 201 may obtain mapping information comprising the location and/or mapping data of the plurality of client terminal(s) 240 and/or of the activity detector(s) 230.

Reference is made once again to FIG. 1. As shown at 102, the process 100 starts with the monitoring application 220 monitoring network activity and/or traffic on the network 250 to detect IT events, in particular access events for accessing one or more of the client terminals 240. By analyzing the activity and/or traffic on the network 250 the monitoring application 220 may detect one or more access events to one or more client terminals 240, for example, a login attempt, installation of a software module, manual interaction with the HMI devices of the client terminal 240 and/or the like.

The monitoring application 220 may further monitor computation resources utilization at one or more of the client terminals 240 to detect an increase in the computing resources utilization at one or more of the client terminal 240 which may be indicative of the access event. The monitoring application 220 may further analyze the activity and/or traffic on the network 250 to detect access events relating to accesses to one or more of the network resources via one or more of the client terminals 240, for example, accessing a storage resource, accessing a computation resource, accessing a service, using a printer and/or the like. For example, the monitoring application 220 may detect an access made from one or more of the client terminals 240 to a database network resource to retrieve information stored in the database. In another example, the monitoring application 220 may detect an access made from one or more of the client terminals 240 to a human resources service to retrieve personal information.

In addition to analyzing the activity and/or traffic on the network 250, the monitoring application 220 may detect the access event using one or more monitoring techniques facilitated in the client terminals 240. For example, one or more agents may be installed and executed in the client terminal(s) 240 which may generate an indication, for example, a message to the monitoring application 220 whenever such an access event is detected at the respective client terminal(s) 240. In another example, the monitoring application 220 may continuously and/or periodically probe the client terminal(s) 240 to identify the access event(s). For example, the monitoring application 220 may probe an activity log that may be maintained by one or more of the client terminal(s) 240 to log access events made to the respective client terminal 240.

Optionally, the monitoring application 220 collects operational status information relating to the accessed network resource(s) 240, for example, an operational state (ON/OFF) of the accessed network resource(s) 240, is a lead open/closed for a laptop type accessed network resource(s) 240 and/or the like.

As shown at 104, the monitoring application 220 may obtain sensory activity data from one or more of the activity detectors 230. The monitoring application 220 may continuously and/or periodically collect the sensory activity data. Additionally and/or alternatively, the monitoring application 220 may collect the sensory activity data from the activity detector(s) 230 following the detection of the access event(s). The sensory activity data may comprise spatial physical activity data of one or more of persons such as the persons 310 in a monitored location such as the monitored location 300. Optionally, the sensory activity data includes temporal information assigned to the at least some of the spatial activity data provided by one or more of the activity detectors 230. For example, one or more of the activity detectors 230 may assign a time tag to the sensory spatial activity data, for example, in a metadata record associated with the respective sensory spatial activity data. In another example, the monitoring application 220 assigns the time tag to the spatial activity data provided by the activity detector(s) 230.

Naturally, the collected sensory activity data depends on the type of the activity detector(s) 230 deployed in the monitored location 300. For example, in case the activity detector(s) 230 include one or more of the motion sensors, for example, a PIR sensor, a MW sensor, an ultrasonic sensor and/or the like, the sensory activity data may include motion data of the detected person(s) 310. In another example, assuming the activity detector(s) 230 include one or more of the presence sensors, for example, a door open/close sensor, an acoustic sensor and/or the like, the sensory activity data may include presence data of the detected person(s) 310. In another example, in case the activity detector(s) 230 include one or more of the imaging sensors, for example, a camera, an infrared sensor and/or the like, the sensory activity data provided by the imaging sensor(s) may include motion, presence and/or activity of the person(s) 310. In another example, assuming the activity detector(s) 230 include one or more of the acoustic sensors, the sensory activity data captured by the acoustic sensor(s) may include, for example, a sound of typing on a keyboard of the client terminal(s) 240, a sound of plug insertion/ejection to the client terminal(s) 240, a sound of a peripheral device insertion/ejection to the client terminal(s), a mechanical operation to the client terminal(s) (e.g. a server door open/close, a laptop lid open/close, etc.) and/or the like.

In another example, the activity detector(s) 230 include one or more of the HMI monitoring sensors, for example, a sensor detecting typing on the keyboard of the respective client terminal 240, a sensor detecting a movement of a pointing device of the client terminal 240, a sensor detecting a presence, insertion and/or ejection of a cable plug in a certain port of the client terminal 240, a sensor detecting a presence, insertion and/or ejection of a peripheral device in a certain port of the client terminal 240 and/or the like. In such case, the sensory activity data may include user interaction events as captured by the HMI monitoring sensor(s).

As shown at 106, the monitoring application 220 analyzes the sensory activity data, for example, extracts, analyzes, infers, manipulate and/or the like to identify an activity pattern for one or more of the persons 310 in the monitored location 300. Naturally, the analysis conducted by the monitoring application 220 is adapted to the type of the sensory activity data and/or the type of the activity detector(s) 230 which provide the sensory activity data. For example, assuming the sensory activity data comprises images captured by one or more imaging sensor type activity detectors 230, the monitoring application 220 may apply, for example, one or more image processing tools, techniques and/or algorithms as known in the art to identify the person(s) 310 and their physical activity attributes. In another example, the monitoring application 220 applies one or more audio tools, techniques and/or algorithms as known in the art to identify the sound captured by one or more acoustic sensor type activity detectors 230. In another example, the monitoring application 220 analyzes the received presence data to estimate a presence of the person(s) 310 in the monitored area 302.

For example, the monitoring application 220 may analyze the data received from a certain door open/close sensor type activity detector 230 to estimate a presence of one or more persons 310 in the respective area 302 monitored by the certain door open/close sensor.

The activity patterns present spatiotemporal physical activity of the person(s) 310 such that physical activity of the person(s) 310 is mapped to a specific location during a certain time. The activity pattern may describe (portray) one or more activity attributes of the person(s) 310, for example, a timing, a presence, duration of the presence, a movement, a path of movement, duration of the movement and/or the like.

The activity pattern may further include additional activity attributes of the person(s) 310, for example, a posture, an orientation, a relative position with respect to one or more client terminal(s) 240 and/or the like. Such additional activity attributes may be identified using one or more analysis techniques, for example, analyzing one or more images captured by one or more imaging sensor type activity detectors 230. In addition, the activity pattern may be correlated with the physical activity of one or more other persons 310, for example, the presence of other person(s) 310 and/or the like.

Moreover, the activity pattern may describe a manual interaction of one or more of the person(s) 310 with the client terminal(s) 240, in particular with the HMI of the client terminal(s) 240, for example, the keyboard, the pointing device, the cable ports, the peripheral device ports and/or the like. The monitoring application 220 may identify such manual interaction by, for example, analyzing one or more images captured by one or more of the activity detectors 230, analyzing sensory data received from one or more HMI sensor type activity detectors 230 and/or the like.

Naturally, the activity patterns may be created by aggregating sensory activity data obtained from multiple activity detectors 230 of the same and/or of different types to enhance the activity pattern to better describe the physical activity of the person(s) 310. For example, the monitoring application 220 may collect presence activity data from one or more of the motion sensors 230 and/or presence sensors 230 detecting one of the persons 310 as well as posture activity attributes identified by analyzing one or more images obtained from one or more imaging sensors. The monitoring application 220 may aggregate, combine and/or complement the sensory activity data to generate the activity patterns. In another example, the sensory activity data may further include manual interaction data received from one or more HMI sensor type activity detectors 230 monitoring the HMI of a client terminal 240. The monitoring application 220 may then further enhance the activity pattern generated for the person 310 to include the manual interaction activity.

As shown at 108, the monitoring application 220 may correlate between the detected access event(s) and the identified activity patterns of the person(s) 310 currently located in the monitored location 300. Having access to the mapping information of the network resource(s) 240 and of the activity detector(s) 230, the monitoring application 220 may correlate between the activity patterns comprising the spatiotemporal physical activity data of the person(s) 310 and the spatiotemporal information relating to the detected access event(s). This means that for a certain access event, the monitoring application 220 may determine the spatial location of the accessed network resource(s) 240 and the timing of the access event (temporal data).

Similarly, the monitoring application 220 may determine the location and activity attributes of the physical activity of the person(s) 310 according to the identified activity patterns including a timing of such physical activity.

The monitoring application 220 may then correlate between the detected access event(s) and the physical activity of the person(s) 310 and based on the correlation, evaluate a validity of the access event(s). The monitoring application 220 may evaluate the access event(s)' validity by evaluating whether the access event is a valid access event initiated by an authorized person 310 or an invalid access event which may potentially be malicious and may therefore present a security threat.

The monitoring application 220 may apply one or more techniques and/or validation rules to evaluate the validity of the access event(s). The validation rules may define, for example, a capability condition for the person(s) 310 identified by the correlated activity pattern to actually access the accessed client terminal 240. The validation rules may further include comparison of the activity pattern(s) identified for the person(s) 310 with one or more predefined activity patterns. The validation rules may also include comparison of the activity pattern(s) identified for the person(s) 310 with activity pattern(s) of one or more other persons. In some embodiments, the validation rules may be predefined for the monitoring application 220 by the user(s) 260. Optionally, the monitoring application 220 may apply one or more machine learning methods, techniques and/or algorithms to constantly evolve and learn the validation rules and/or typical activity patterns, in particular the activity patterns which may be suspicious by analyzing security breach events and the activity patterns that may be correlated with such security breach events. Moreover, the monitoring application 220 may apply the machine learning to identify activity patterns over time which may be typical to one or more of the persons 310 typically occupying the monitored location 300. Such activity patterns, in particular correlated with certain access event(s) may be considered by the monitoring application 220 as legitimate (valid) access events.

The validation rules may define positive and/or negative correlation of the access event(s) with the identified activity patterns. Negative correlation means that the monitoring application 220 cannot correlate between a certain detected access event and the physical activity of any of the person(s) 310 currently present in the monitored location 300. This may be indicative that the certain access event is initiated from a remote location and/or by automated application executing at the accessed network resource(s) and may therefore present a potential security threat. Positive correlation means that the monitoring application 220 is able to correlate between the certain access event and the physical activity pattern of one or more person(s). The monitoring application 220 may further analyze the correlated activity pattern to evaluate whether the activity pattern describes an out of ordinary, a suspicious and/or an unauthorized physical activity which may be indicative of a potential security threat.

As discussed herein above, the validation rules applied by the monitoring application 220 to evaluate the validity of the access event may specify one or more definitions for the capability of person(s) 310 to actually (physically) access to the client terminal(s) 240, an access which triggered the detected access event. Such capability conditions may include for example, whether there are one or more persons 310 in operational proximity to the accessed network resource(s) 240. In case no person 310 is in operational proximity to the accessed network resource 240, the monitoring application may evaluate and/or determine that the detected access event is triggered by an access from remote location, and/or initiated by one or more automated applications executed on the accessed client terminal 240 with no human intervention.

The operational proximity may further define a maximal proximity (e.g. 1 meter) of the person(s) 310 to the accessed client terminal 240 which may allow the person(s) 310 to actually initiate the detected access event to the accessed client terminal 240. Applying such a validation rule, the monitoring application 220 may evaluate that even though one or more of the person(s) 310 is present in the area 302 in which the access event was detected, the detected person(s) 310 could not initiate the detected access event since they are not in the operational proximity to the accessed client terminal 240.

For example, assuming the accessed client terminal 240 is a processing node such as the processing node 240A and the detected access event is a login attempt, i.e. a password typing. Analyzing the sensory activity data received, for example, from a motion sensor such as the activity detector 230A deployed in the area 302 (office), a motion sensor such as the motion sensor 230J, a wearable sensor carried by person(s) 310 and/or the like, the monitoring application 220 may identify one or more activity patterns for the person(s) 310 detected in the monitored location 300. Based on the identified activity patterns, the monitoring application 220 may determine that no person 310 is currently (at time of the access event detection) located in proximity to the processing nodes 240A, i.e. no person 310 is currently located in an area such as the area 302A. The monitoring application 220 may therefore determine that the detected access event to the processing node 240A may be an invalid access. However, in a similar access event directed to a processing node such as the processing node 240B, the monitoring application 220 may determine that the access event is a valid one as a person 310 such as the person 310B is in operational proximity to the accessed processing node 240B and may have therefore initiated the access event.

In another example, assuming the accessed client terminal 240 is a processing node such as the processing node 240B and the detected access event is a login attempt, i.e. a password typing. Analyzing the sensory activity data received, for example, from an imaging sensor such as the activity detector 230B deployed in the area 302B (office) and/or the like, the monitoring application 220 may identify one or more activity patterns for the person(s) 310 detected in the monitored location 300. According to the identified activity pattern(s), the monitoring application 220 may identify whether one or more of the persons 310 manually, in particular the person 310B interacted with the accessed processing node 240B, in particular with the HMI of the accessed processing node 240B.

The monitoring application 220 may identify such interaction by, for example, analyzing the activity patterns which may include manual interaction activity in the sensory activity data received from an HMI sensor 230 monitoring the HMI of the accessed processing node 240B. Moreover, some access events may require authentication actions by the person 310 accessing the respective client terminal 240, for example, pressing a confirmation key on the keyboard (e.g. "Y/y"), marking a check box with the pointing device (e.g. clicking with the mouse) and/or the like. Assuming such an authentication action is detected during the detected access event while the monitoring application 220 cannot correlate the detected access event with the identified activity pattern(s), the monitoring application 220 may evaluate the detected access event as an invalid access event. For example, in case the monitoring application 220 determines, based on the identified activity pattern(s), that no person 310 is in operational proximity to the accessed client terminal 240 and/or no person 310 is present in the area 302 of the accessed client terminal 240, the monitoring application 220 may evaluate the detected access event as an invalid access event.

Moreover, assuming the activity pattern of one or more of the persons 310 comprises the additional activity attributes such as the posture, the orientation, the relative position with respect to the accessed client terminal(s) 240 and/or the like, the monitoring application 220 may further base the evaluation and determination of the access event(s) validity on these additional activity attributes. For example, assuming the accessed client terminal 240 is the processing node 240B. While according to the activity pattern(s), the person 310B is identified in close proximity to the processing node 240B, the monitoring application 220 may identify based on the activity pattern(s) that the person 310B is facing away from the processing node 240B, in particular, away from the HMI of the processing node 240B. In another possible scenario, the monitoring application 220 may identify that the posture of the person 310B suggests the person 310B is unable to manually interact with the HMI of the processing node 240B. In such cases the monitoring application 220 may therefore evaluate that even though the person 310B is in close proximity to the processing node 240B, the person 310B is not in operational proximity to the processing node 240B he may be unable to initiate the detected access event.

In another example, assuming the accessed network resource is a wireless network access point such as the wireless network access point 245I and the access event is an attempt to access a network provided by the wireless network access point 245I. The monitoring application 220 may analyze the detected access event to identify the origin of the access, i.e. the client terminal 240 which initiated the access to the network of the wireless network access point 245I. Analyzing the activity patterns, the monitoring application 220 may evaluate whether one or more of the person(s) 310 using a client terminal such as the client terminal 240 is in coverage range of the accessed wireless network access point 245I in order to evaluate whether the access event is initiated by this person(s) 310.

As discussed herein above, the validation rules applied by the monitoring application 220 to evaluate the validity of the access event may include comparing the identified activity pattern(s) of the person(s) 310 to one or more predefined activity patterns. The predefined activity patterns may be set for the monitoring application 220 by the user(s) 260. However, the predefined activity pattern(s) may be learned by the monitoring application 220 by tracking the activity of one or more persons 310 in the monitored location 300 over time and applying the machine learning algorithm(s) to identify typical activity pattern(s), in particular activity patterns in correlation to access event(s). By comparing the identified activity pattern(s) to the predefined activity pattern(s), the monitoring application 220 may identify unordinary physical activity which may be indicative of a potential unauthorized access event(s). In case the monitoring application 220 determines that the physical activity of the person(s) 310 correlated with the detected access event(s) does not comply with the predefined activity pattern(s), the monitoring application 220 may evaluate that the detected access event(s) is invalid.

For example, a certain predefined activity pattern may dictate that presence of the person(s) 310 is restricted to certain times of day (e.g. working hours) and/or to certain days of the week (e.g. working days). In case the monitoring application 220 determines the access event is correlated with physical activity of the person(s) 310 out of working hours and/or working days, the monitoring application 220 may evaluate that the access event(s) is invalid. In another example, the predefined activity pattern may dictate that presence of the person(s) 310 is restricted in a certain area such as the area 302 of a monitored location such as the monitored location 300 at all times. In case the monitoring application 220 determines the access event is correlated with a client terminal(s) 240 located in the restricted area 302 and/or the physical activity of the person(s) 310 is detected in the restricted area 302, the monitoring application 220 may evaluate the access event(s) is invalid. In another example, the predefined activity pattern may dictate that a certain client terminal 240, for example, an administrator processing node 240 may not be accessed without first validating an identity of the user 260 (e.g. the system administrator). In case the monitoring application 220 determines the access event is correlated with the administrator processing node 240 and the person(s) whose physical activity is described by the correlated activity pattern has not identified himself(s), the monitoring application 220 may determine the access event(s) is invalid.

In another example, the predefined activity pattern may dictate that two or more certain client terminal 240 may not be operated at the same time. In case the monitoring application 220 determines a simultaneous access to the certain processing nodes 240 is correlated with activity pattern of two or more persons 310 simultaneously accessing the certain processing nodes 240, the monitoring application 220 may evaluate the access events are invalid.

In another example, the predefined activity pattern may dictate that a certain account may be accessed from a single location, i.e. a single client terminal 240 at any given time. In case the monitoring application 220 determines a simultaneous access to enter and/or use the certain account is done from multiple (i.e. two or more) client terminals 240 at the same time, the monitoring application 220 may evaluate the concurrent access events as suspicious and potentially malicious. The monitoring application 220 may evaluate the concurrent access events as suspicious regardless of whether the concurrent access events can be correlated with the identified activity patterns of the users 310 or not, i.e. the access event(s) are initiated in the client terminal(s) 240 remotely (from remote client terminal(s) 240 either in the monitored location 300 and/or offsite). Such a scenario may be indicative that at least some of the concurrent access events are initiated by unauthorized parties and as such the monitoring application 220 may determine that the concurrent access may present a potential security threat and evaluate it as invalid.

In another example, by analyzing the activity pattern of a certain person 310, for example, the person 310D, the monitoring application 220 may detect that the person 310D continuously and/or repeatedly accesses one of the client terminal 240, for example, the processing node 240D in the office 302D and immediately following the access goes to the printers room 302H. The monitoring application 220 may evaluate this physical activity as suspicious and may thus evaluate the access event(s) to the processing node 240D as invalid. The monitoring application may further enhance the evaluation by comparing the activity pattern of the person 310D with activity pattern(s) previously learned for one or more persons 310 that typically occupy and/or work in the office 302D to evaluate whether the activity pattern 310D is unusual compared to typical physical activity observed for the occupants (persons 310) of the office 302D.

In another example, one or more validation rules may define certain access event(s) as supervised accesses in which multiple person(s) 310 are involved, for example, an operator accessing the client terminal 240 (e.g. typing no the keyboard of the client 240) and a manager supervising the access. Assuming the monitoring application 220 detects a supervised access and correlates between the detected access event and the activity pattern of a single person 310, for example, the person 310B, i.e. the person 310B is the only person 310 present in the area 302B (office) at the time of the "supervised" access event detection. The monitoring application 220 may therefore evaluate the "supervised" access event as suspicious and potentially malicious and estimate the "supervised" access event as invalid.

In another example, one or more validation rules may define that certain access event(s) are location specific such that these access event(s) may take place at certain locations and/or using certain client terminal(s) 240. For example, assuming the validation rule(s) define a certain location specific access event that may only be initiated from the client terminal 240C. In case the monitoring application 220 detects the certain location specific access event while no one is present in the area 302C, the monitoring application 220 may be unable to positively correlate between the certain location specific access event and an identified activity pattern of the user(s) 310. The monitoring application 220 may therefore evaluate the certain location specific access event as suspicious and potentially malicious and hence the certain location specific access event may be invalid.

As discussed herein above, the validation rules applied by the monitoring application 220 to evaluate the validity of the access event may include comparing the activity pattern identified for one or more of the persons 310 with the activity patterns identified for one or more other persons. By comparing the identified activity pattern(s) of certain person(s) 310 to that of other person(s) 310, the monitoring application 220 may identify unordinary and/or suspicious physical activity of the certain person(s) 310 which may be indicative of a potential unauthorized access event(s). In case the monitoring application 220 determines the physical activity of the certain person(s) 310 correlated with the detected access event(s) does not comply with the activity patterns of the other person(s) 310, the monitoring application 220 may evaluate that the detected access event(s) is invalid.

For example, assuming an activity pattern of a certain person 310, for example the person 310B, indicates, the person 310B is present in the area 302B while according the activity patterns of all other persons 310 in the monitored location 300, all the other persons 310 are currently gathered together, for example, in the conference room 302I. Further assuming an access event is detected for accessing the processing node 240B at the time of the gathering. In such case the monitoring application 220 may correlate between the detected access event and the physical activity of the person 310B and may further evaluate that the physical activity of the person 310B is suspicious and potentially harmful and may therefore evaluate the detected access as an invalid access event.

In another example, assuming several persons 310, for example, the person 310I1, the person 310I2 and the person 302I3 convene together in the conference room 302I. Further assuming that at some point in time two of the persons 310, for example, the persons 310I1 and the person 310I2 leave the conference room 302I such that the person 302I3 is left alone in the conference room 302I. Assuming that during the time the person 310I3 is alone in the conference room 302I, the monitoring application 220 detects an access event in which one or more client terminals 240 located in the conference room 302I, for example, the processing node 240I is accessed.

The monitoring application 220 may correlate between the detected access event and the physical activity of the person 310I3. Based on the fact that the person 310I3 initiated the access once left alone in the conference room 302I, the monitoring application 220 may determine the access event as suspicious and may evaluate the access event as invalid. Such evaluation and/or determination of the monitoring application 220 may be further conclusive in case some of the persons 310, for example, the persons 310I1 and the person 310I2 carry dynamic activity detectors 230 while the person 310I3 does not carry such a dynamic activity detector 230. This may be indicative to the fact that the person 310I3 is a guest in the monitored location 300. The monitoring application 220 may use such identification information to more accurately evaluate the access event as valid or invalid.

In some embodiments of the present invention, the monitoring application may apply one or more validation rules and/or learned physical activity patterns which are learned using machine learning to identify suspicious and/or unordinary behavior of the person(s) 310. The validation rules and/or learned activity patterns may define typical physical activity patterns which relate to normal and acceptable physical activity. When the activity pattern detected for one or more of the person(s) 310 deviates from the typical activity patterns, the monitoring application 220 may evaluate that the detected access events correlated with the deviating activity patterns may be suspicious and may therefore present a potential security threat. For example, assuming that based on a certain activity pattern of one of the persons 310, for example, the person 310B, the monitoring application identifies that the person 310B repeatedly accesses a certain client terminal 240, for example, the client terminal 240B and immediately after the detected access, the person 310B quickly goes to the printer room 302H to collect printed material. The monitoring application 220 may identify such activity pattern (correlated with the access events) as suspicious and potentially malicious.

Optionally, in case the monitoring application 220 has the operational status information of the accessed client terminal(s) 240, the monitoring application 220 may further evaluate this operational status information as part of the evaluation and/or determination of the access event(s) validity. For example, assuming the lead is closed for an accessed laptop type client terminal 240, the monitoring application 220 may determine the event access is invalid and may preset a potential security threat as the access event may not initiated by a person 310 physically accessing the laptop. In such case, the monitoring application 220 may evaluate that the access event is initiated, for example, by a potential malicious automated software application, for example, an agent, an application, a script and/or the like executed on the laptop, initiated remotely from another network resource and/or the like. Such another network resource may typically not be one of the client terminals 240 since these are monitored by the monitoring application 220. The remote access may therefore potentially be initiated from an external and/or unauthorized user and/or device attempting to access the accessed client terminal 240.

As shown at 110, based on the validity determination, in case the detected access event(s) are estimated to be invalid, the monitoring application 220 may initiate one or more actions, for example, generate an alert to indicate one or more parties of the detected potentially invalid access event(s). The monitoring application 220 may generate the alert to one or more persons, for example, an IT officer, a system administrator, a security person and/or the like. Additionally and/or alternatively, the monitoring application 220 may generate the alert to one or more automated systems, for example, a security system, a Security Operations Center (SOC), a Security Information and Event Management (SIEM) system and/or the like. Additionally and/or alternatively, the monitoring application 220 may initiate one or more additional actions, for example, prevent the access to the accessed client terminal(s) 240, prevent the access to the accessed network resource(s), invoke a deception measure to mislead and/or contain the potentially malicious access event and/or the like.

It is expected that during the life of a patent maturing from this application many relevant systems, methods and computer programs will be developed and the scope of the term activity detector is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of correlating between detected access events to access client terminals in a monitored location and physical activity of people in said monitored location, comprising:
   detecting, by a monitoring system connected to a first network, at least one access event to access at least one of a plurality of client terminals located in a monitored location and operatively connected to said first network;
   receiving by said monitoring system, sensory activity data transmitted by at least one activity detector to said monitoring system, over a second interconnection isolated from said first network, said at least one activity detector is deployed in said monitored location to capture physical activity of people in said monitored location;
   analyzing said sensory activity data, to identify a spatiotemporal activity pattern of at least one person in said monitored location;
   correlating between said at least one access event and said spatiotemporal activity pattern to validate said at least one access event;
   wherein said validation is evaluated by analyzing said spatiotemporal activity pattern of said at least one person to evaluate whether said at least one person is located in a proximity to said at least one client terminal allowing for said at least one person to initiate said at least one access event; and
   initiating at least one action according to said validation.

2. The computer implemented method of claim 1, wherein said correlation is done by comparing spatiotemporal data relating to said at least one access event with said spatiotemporal activity pattern.

3. The computer implemented method of claim 1, further comprising detecting at least one access event in which at least one network resource is accessed via said at least one client terminal, said at least one network resource is a member of a group consisting of: a network, a storage resource, a service and an application.

4. The computer implemented method of claim 1, wherein said at least one access event is a member of a group consisting of: a login attempt to said at least one client terminal, installation of a software module on said at least one client terminal, a manual interaction with said at least one client terminal, an increase in utilization of computing resources at said at least one client terminal and an access attempt to at least one network resource.

5. The computer implemented method of claim 1, wherein said at least one activity detector is a motion sensor capturing motion of said at least one person.

6. The computer implemented method of claim 1, wherein said at least one activity detector is a presence sensor capturing a presence of said at least one person.

7. The computer implemented method of claim 1, wherein said at least one activity detector is an imaging sensor capturing at least one of a motion, a presence and an activity of said at least one person.

8. The computer implemented method of claim 1, wherein said at least one activity detector is an acoustic sensor capturing a sound of at least one of: a typing on a keyboard of said at least one client terminal, a plug insertion or ejection to said at least one client terminal, a peripheral device insertion or ejection to said at least one client terminal and a mechanical operation to said at least one client terminal.

9. The computer implemented method of claim 1, wherein said at least one activity detector is a Human-Machine Interface (HMI) monitoring sensor capturing at least one of: a keyboard typing on a keyboard of said at least one client terminal, a movement of a pointing device of said at least one client terminal, a plug insertion or ejection to said at least one client terminal, a peripheral device insertion or ejection to said at least one client terminal and a mechanical operation to said at least one client terminal.

10. The computer implemented method of claim 1, wherein said sensory activity data is received from a plurality of activity detectors, wherein sensory data received from at least one activity detector of said plurality of activity detectors is received through at least one another activity detector, said at least one activity detector generates an indication indicating of said physical activity, said indication is captured by said at least one another activity detector which forwards said indication.

11. The computer implemented method of claim 1, wherein a physical location of said at least one activity detector is indicated in at least one of a structural and a layout map of said monitored location.

12. The computer implemented method of claim 1, wherein a physical location of said at least one client terminal is indicated in at least one of a structural and a layout map of said monitored location.

13. The computer implemented method of claim 1, wherein said analysis further comprising analyzing location data associated with said at least one person to identify said spatiotemporal activity pattern, said location data is collected from at least one wearable activity detector carried by said at least one person.

14. The computer implemented method of claim 1, further comprising identifying an operational status of said at least one client terminal.

15. The computer implemented method of claim 1, wherein said spatiotemporal activity pattern comprises at least one member of a group consisting of: a presence, a duration of presence, a movement, a path of movement, a duration of movement, a presence of another person and a physical interaction with the client terminal.

16. The computer implemented method of claim 1, wherein said analysis further comprising analyzing said sensory activity data to determine at least one of a posture, a direction and an orientation of said at least one person.

17. The computer implemented method of claim 1, wherein said validation is evaluated by comparing said activity pattern of said at least one person to at least one predefined activity pattern to identify a suspicious activity of said at least one person with respect to said at least one access event.

18. The computer implemented method of claim 1, wherein said validation is evaluated by comparing said activity pattern of said at least one person to said activity pattern of at least one another person to identify a suspicious activity of said at least one person with respect to said at least one access event.

19. The computer implemented method of claim 1, wherein said at least one action is a member of a group consisting of: generating an alert, preventing said access to said at least one client terminal, preventing said access to at least one network resource and invoking a deception measure.

20. The computer implemented method of claim 1, wherein said at least one activity detector is a plurality of activity detectors and wherein said analyzing comprising generating said spatiotemporal activity pattern by aggregating, combining and complementing received sensory activity data from the plurality of activity detectors.

21. The computer implemented method of claim 1, wherein said computer implemented method is implemented as a monitoring application installed on at least one of said plurality of client terminals.

22. A system for correlating between detected access events to access client terminals in a monitored location and physical activity of people in said monitored location, comprising:
   at least one activity detector deployed in monitored location;
   at least one processor coupled to a plurality of client terminals through a first network and to said at least one activity detector through a second interconnection isolated from said first network, said at least one processor is adapted to execute code, said code comprising:
   code instructions to detect at least one access event to access at least one of said plurality of client terminals;
   code instructions to receive sensory activity data transmitted by the at least one activity detector to said processor, over said second interconnection isolated from said first network, said at least one activity detector is deployed in said monitored location to capture physical activity of people in said monitored location;
   code instructions to analyze said sensory activity data to identify a spatiotemporal activity pattern of at least one person in said monitored location;
   code instructions to correlate between said at least one access event and said spatiotemporal activity pattern to validate said at least one access event;
   wherein said validation is evaluated by analyzing said spatiotemporal activity pattern of said at least one person to evaluate whether said at least one person is located in a proximity to said at least one client terminal allowing for said at least one person to initiate said at least one access event; and
   code instructions to initiate at least one action according to said validation.

23. A software program product for correlating between detected access events to access client terminals in a monitored location and physical activity of people in said monitored location, comprising:
   a non-transitory computer readable storage medium;
   first program instructions for detecting, by a monitoring system connected to a first network, at least one access event to access at least one of a plurality of client terminals located in a monitored location and operatively connected to said first network;
   second program instructions for receiving by said monitoring system, sensory activity data transmitted by at least one activity detector to said monitoring system, over a second interconnection isolated from said first network, said at least one activity detector is deployed in said monitored location to capture physical activity of people in said monitored location;
   third program instructions for analyzing said sensory activity data to identify a spatiotemporal activity pattern of at least one person in said monitored location;
   fourth program instructions for correlating between said at least one access event and said spatiotemporal activity pattern to validate said at least one access event;
   wherein said validation is evaluated by analyzing said spatiotemporal activity pattern of said at least one person to evaluate whether said at least one person is located in a proximity to said at least one client terminal allowing for said at least one person to initiate said at least one access event; and
   fifth program instructions for initiating at least one action according to said validation; wherein said first, second, third, fourth and fifth program instructions are executed by at least one processor from said non-transitory computer readable storage medium.

* * * * *